United States Patent
Rudrapatna et al.

(10) Patent No.: US 8,300,584 B2
(45) Date of Patent: Oct. 30, 2012

(54) SYSTEM AND METHOD FOR CELL-EDGE PERFORMANCE MANAGEMENT IN WIRELESS SYSTEMS USING DISTRIBUTED SCHEDULING

(75) Inventors: Ashok N. Rudrapatna, Basking Ridge, NJ (US); Ganapathy S. Sundaram, Hillsborough, NJ (US); Subramanian Vasudevan, Morristown, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 564 days.

(21) Appl. No.: 12/455,215

(22) Filed: May 30, 2009

(65) Prior Publication Data

US 2010/0284345 A1   Nov. 11, 2010

Related U.S. Application Data

(60) Provisional application No. 61/215,998, filed on May 11, 2009.

(51) Int. Cl.
    *H04W 80/00*    (2009.01)

(52) U.S. Cl. ............ 370/329; 370/338; 455/452.1
(58) Field of Classification Search ............... None
    See application file for complete search history.

(56) References Cited

U.S. PATENT DOCUMENTS

| | | | |
|---|---|---|---|
| 2007/0207828 A1* | 9/2007 | Cheng et al. | 455/522 |
| 2008/0198785 A1* | 8/2008 | Huang et al. | 370/312 |
| 2009/0116389 A1* | 5/2009 | Ji et al. | 370/235 |
| 2010/0081448 A1* | 4/2010 | Wong et al. | 455/452.1 |
| 2010/0214997 A1* | 8/2010 | Tao et al. | 370/329 |

* cited by examiner

*Primary Examiner* — Robert Scheibel
(74) *Attorney, Agent, or Firm* — J.B.M$^{ac}$Intyre

(57) ABSTRACT

A method is provided for scheduling transmission resources to a mobile station served by a plurality of base stations. According to the method of the invention, feedback information respecting data received by the mobile station from each of at least two of the plurality of base stations is received by the each of the plurality of base stations. An inference is then drawn at a second of the plurality of base stations of throughput parameters respecting a transmission channel between a first of the plurality of base stations and the mobile station. Transmission resources for the mobile station are then scheduled by the second base station as a function of the inferred throughput parameters.

5 Claims, 5 Drawing Sheets

F1: Common Carrier Frequency

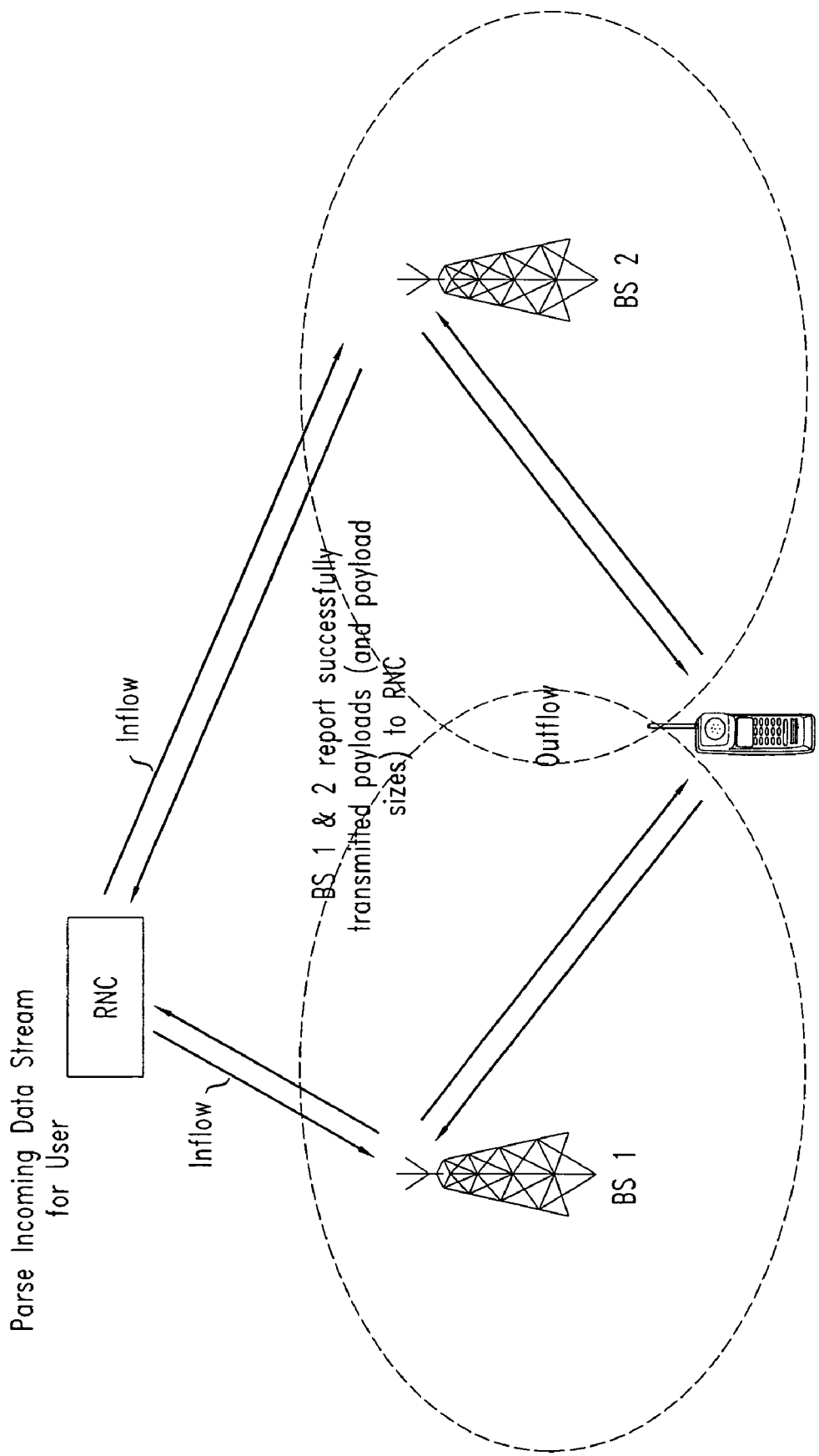

ved by the method of the invention, feedback information respecting data received by the mobile station from each of at least two of the plurality of base stations is transmitted from the mobile station at a power level adequate to insure receipt by both of the at least two base stations. An inference is then drawn at a second of the at least two base stations of throughput parameters respecting a transmission channel between a first of the at least two base stations and the mobile station. Transmission resources for the mobile station are then scheduled by the second base station as a function of the inferred throughput parameters.
SYSTEM AND METHOD FOR CELL-EDGE PERFORMANCE MANAGEMENT IN WIRELESS SYSTEMS USING DISTRIBUTED SCHEDULING

RELATED APPLICATIONS

This application claims priority pursuant to 35 U.S.C. Sec 119(e) to U.S. Provisional Application No. 61/215,998, filed May 11, 2009, entitled "SYSTEM AND METHOD FOR CELL-EDGE PERFORMANCE MANAGEMENT IN WIRELESS SYSTEMS," the subject matter thereof being fully incorporated herein by reference.

The disclosed invention is related to U.S. patent application Ser. No. 12/455,220, filed concurrently herewith, entitled "SYSTEM AND METHOD FOR CELL EDGE PERFORMANCE MANAGEMENT IN WIRELESS SYSTEMS USING CENTRALIZED SCHEDULING" which is assigned to the same assignee and is incorporated herein by reference.

FIELD OF THE INVENTION

The present invention generally relates to cell-edge performance management in wireless systems.

BACKGROUND OF THE INVENTION

In wireless communications, users situated relatively far from a base station that serves them are generally more susceptible to interference from neighboring base stations and to signal attenuation. As a consequence, such users may experience relatively low signal-to-interference-and-noise ratios (SINRs), and thus typically receive much lower data rates than users located nearer to the base station. The relatively distant users are referred to as "cell edge users" or as users with "poor geometry." It will be understood that when one user is said to be more "distant" from the base station than another, what is meant does not depend solely on geographical distance, but also to susceptibility to other factors leading to attenuation and interference. It is noted that the terms "user" and "mobile station" are generally used interchangeably herein to denote a mobile entity or device operative to exchange communications signals with the wireless communication system. Any deviation from such interchangeability should be apparent from the context.

Wireless packet data systems of the current art (for example, systems implemented according to the Evolution-Data Optimized (EV-DO), High Speed Packet Access (HSPA), or Worldwide Interoperability for Microwave Access (WiMAX) wireless protocols)), as well as those projected for deployment in the near future, such as the 3GPP Long Term Evolution (LTE) project), use schedulers located at base stations to determine transmission timing and format—including data rate, modulation and coding rates, power and frequency allocation—for data transmissions to the mobile users. Based on channel quality feedback from the mobile stations, the schedulers attempt to transmit to users in a manner to take advantage of favorable quality conditions in these channels. Further these schedulers implement scheduling algorithms for balancing the competing demands of all the users seeking to receive data from each base station, using fairness criteria that take into account the throughputs and latencies experienced by the users.

A significant performance issue, however, associated with wireless packet data systems is the great disparity between the data rates that are achievable for users near the base station sites and those users that are further away at the cell edge.

To some degree, the poorer channel quality typically experienced by mobile users at the cell edge is mitigated by increasing transmit power and bandwidth at the base station and by the addition of multiple antennas at the base station to support multiple data stream transmission and/or beam-forming to the mobile station. Nonetheless, even with such signal quality enhancements, those mobile stations at the cell edge are still limited to low data rates and cannot realize the quality of service required for newer, low-latency, high data-rate wireless applications. Moreover, even to the degree the mitigation steps described here improve throughput for cell-edge users, they also tend to further improve throughput for users better positioned in the cell, so that the problem of disparity in throughput between cell-edge and other users remains largely unaddressed.

SUMMARY OF INVENTION

An embodiment of the present invention provides a method for scheduling transmission resources to a mobile station served by a plurality of base stations. According to the method of the invention, feedback information respecting data received by the mobile station from each of at least two of the plurality of base stations is transmitted from the mobile station at a power level adequate to insure receipt by both of the at least two base stations. An inference is then drawn at a second of the at least two base stations of throughput parameters respecting a transmission channel between a first of the at least two base stations and the mobile station. Transmission resources for the mobile station are then scheduled by the second base station as a function of the inferred throughput parameters.

In an alternative embodiment, a direct feedback is provided from the mobile station of a payload size received from a first serving base station to a scheduler operating in a second serving base station. Such direct feedback may be sent to the scheduler via a base station service status channel implemented according to the invention, or via another control channel between the mobile station and the scheduling base station.

In a still further embodiment, overall data throughput to a mobile station at the cell edge is properly distributed among the base stations via simultaneous transmissions of different data streams to the mobile station.

BRIEF DESCRIPTION OF THE FIGURES

The teachings of the present invention can be readily understood by considering the following detailed description in conjunction with the accompanying drawings, in which:

FIG. 5 schematically depicts a network control unit conducting flow control for cell-edge users based on throughput feedback from multiple transmitting base stations.

DETAILED DESCRIPTION

Figure 1:
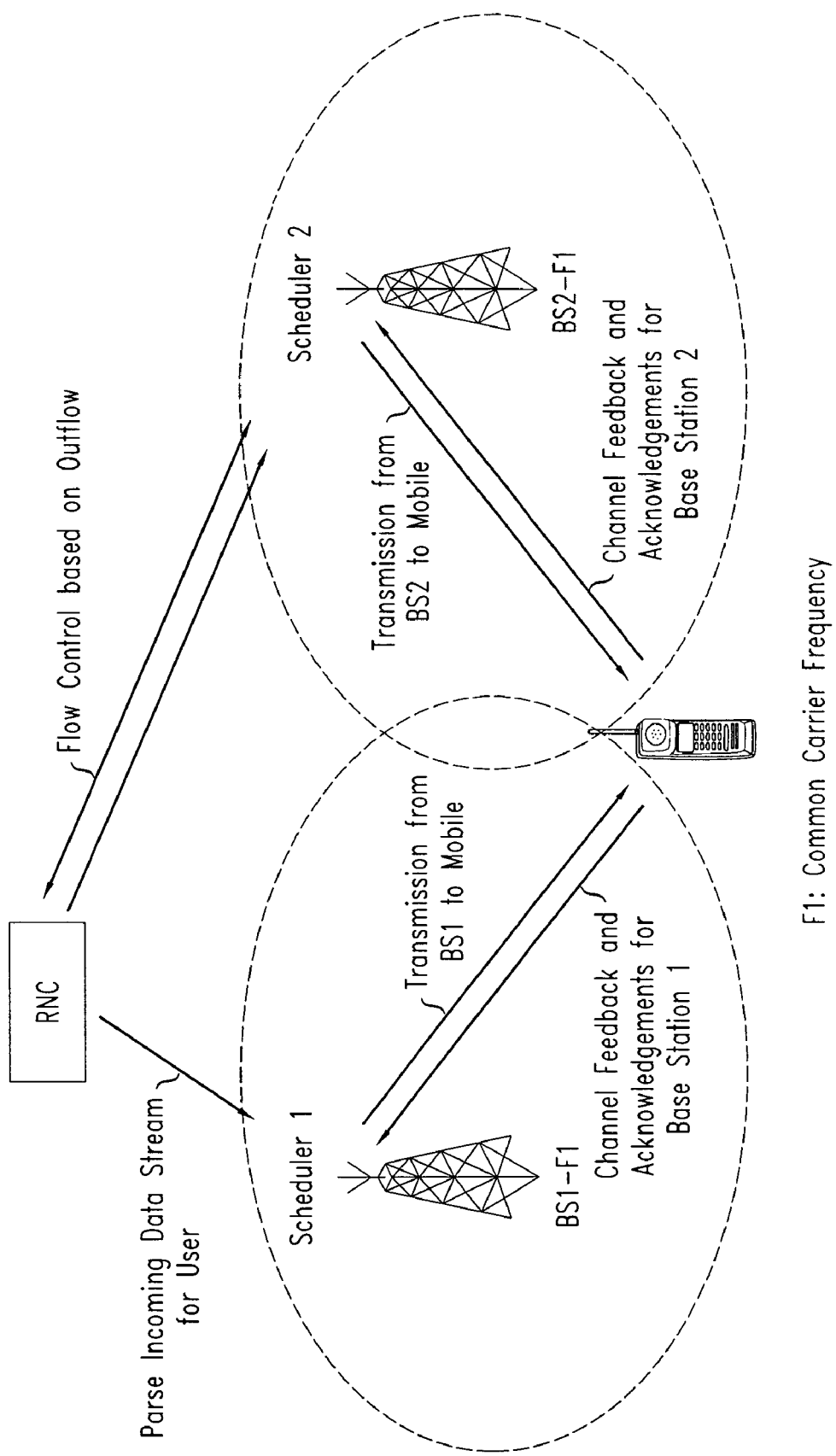
FIG. 1 schematically depicts a wireless system architecture in which the invention can be implemented.

The relatively poor channel quality available to mobile users at the cell edge has generally been addressed in the art through, in effect, trading aggregate cell throughput for performance improvements at the cell edge. Basically, in that approach, the schedulers give more scheduling opportunities to cell edge users thereby increasing the data rates available to them. Alternatively, schedulers may use minimum throughput requirements and increase the number of scheduling instances of cell-edge users in order to improve cell-edge performance. Such rules however constrain scheduler choices and thereby lower overall cell throughput.

Another approach to increasing cell edge throughput is realized in a family of coordinated multi-point transmission schemes (such as Network MIMO) that, in effect, schedule data transmissions centrally for transmission from multiple base station antennas in a coherent combining manner of such transmissions as received by the mobile stations. Such schemes are, however, extraordinarily complex and impose significant bandwidth and latency requirements on the network. They further require tight timing and phase synchronization across antennas of different base stations, as well as a significant amount of channel state feedback from the mobile stations. As a result, these solutions are generally not considered viable for the downlink of cellular systems in the near future.

The inventors have developed, and disclose herein, a system and method that provides a significant improvement in throughput for mobile stations at the cell edge, while at the same time increasing aggregate base station throughput. Thus, with the invention, cell edge performance need no longer be traded for sector throughput; rather, application of the invention for serving cell edge users additionally helps increase overall sector throughput. Moreover, the system and method of the invention avoids the drawbacks of known coordinated multi-point schemes (e.g., Network MIMO).

As a predicate to describing the invention embodiments, it is noted that cell edge users are usually located in zones (typically called handoff zones) where they can potentially receive data from more than one base station. These base stations (and their associated schedulers) are each able to schedule transmissions to these mobile stations, but can do so only in an uncoordinated fashion. Thus, the basic service arrangement in a given wireless cell/sector is one where users that are close in to the base station are typically scheduled by a single base station while those in handoff regions are scheduled by multiple base stations. Those mobile stations located in a handoff region, and receiving data from multiple base stations, will need to provide channel-state feedback associated with data transmissions from each of these base stations for enabling the scheduling decisions at the respective base stations. Correspondingly, these mobile stations must be capable of monitoring the downlink control channels and receiving control signals from each of these base stations.

An overall architecture for handoff-region service arrangement, such as described above, is depicted in FIG. 1. As shown in the figure, the data stream associated with a wireless application is parsed at a centralized controller (illustrated as Radio Network Controller, RNC) and fed downstream to two base stations, BS1 and BS2. These base stations each receive channel-state feedback from a served mobile station located in the handoff zone. Schedulers at each base station operate to schedule transmissions as a function of channel-state feedback (among other things), such scheduling being made to the mobile user independently from each base station.

The advantage of such a system is however also a drawback. Users at the cell edge are able to benefit from transmissions from two or more base stations but since these base stations are operating independently, they cannot effectively control the fairness of the transmission resources made available to the user, typically scheduling the handoff-zone mobile station for either more or less transmission resources than would be appropriate under fairness considerations (relative to resources scheduled for other served mobile stations). Thus, for example, when the mobile station is served more often than would be due under fairness considerations, a penalty is imposed on other mobile stations of the system that are served by only one of these base stations, which therefore lose scheduling opportunities and throughput.

Furthermore, it is advantageous to simultaneously schedule data from multiple base stations to a user since the extension of the superposition principle (efficient re-use of common frequency resources) across multiple base stations can increase data rates and throughput. This capability is not present in base station to mobile transmission systems of the current art.

Accordingly, an objective of the inventors here was the development of an effective mechanism for controlling the fairness of scheduling for all users while maintaining a distributed scheduler implementation, and, as well, to enable superposition of multiple base station transmissions (i.e., the simultaneous scheduling of (and transmission to) a mobile station from multiple base stations using the same frequency resources (e.g. same RF carrier)). They have achieved that objective with the invention disclosed here which enables the actions of the scheduler at one base station to be inferred at another base station, without explicit real-time communication between the two base stations over the backhaul, or alternatively, for an indication of the payload data received at a mobile from multiple serving base stations to be communicated from the mobile station to schedulers at those base stations.

Typically the scheduling base station receives a channel quality report (e.g., CQI or channel quality indicator in the HSPA, LTE and WiMAX systems), or, equivalently, the rate associated with the channel quality (e.g., DRC or data rate control in the EV-DO system), that it uses to determine a supportable data rate for the user at each transmission time interval (or time-slot). Using various metrics to calculate user priorities (as known in the art), the scheduler determines that a particular time-slot should be used for transmission to a given user, and calculates the data rate and corresponding packet format for the scheduled time-slot based on the channel feedback. The mobile station, upon reception of the transmission in its scheduled time-slot, sends back a positive or negative acknowledgment (ACK/NACK). Reception of a NACK at the base station triggers a re-transmission of the packet by the base station while reception of an ACK indicates to the base station that the scheduled transmission was successfully received by the mobile station.

According to an embodiment of the invention, another base station can infer this first base station's actions (as illustratively described above) with respect to user scheduling and rate assignment, if the second base station is also relatively proximate to the mobile station, i.e., is in the handoff zone for the mobile station. In a companion application concurrently filed and cross-referenced above, the inventors disclose a centralized scheduler for addressing scheduling fairness for mobiles located in the hand-off zone and served by multiple base stations, which centralized scheduler represents a near-optimal scheduling fairness approach. Because the inference approach of the present invention embodiment extends in either direction, i.e., base station 1 can also infer base station 2's actions for a served mobile, the invention provides a decentralized scheduling approach with almost the same information as that available to the centralized scheduler, and can therefore potentially approach the performance achieved by the centralized scheduler with lower complexity and without the impact of backhaul delay.

The inference approach of the present invention embodiment operates on two feedback mechanisms from the mobile station—the channel quality feedback and the acknowledgement feedback. While it is a given that both channel quality feedback and acknowledgement feedback are to be transmitted by the mobile station with sufficient power to reach the base station from which the associated transmissions are to be made or have been made, the methodology of the invention further contemplates that the mobile station will transmit this feed back information with sufficient power to reach all scheduling base stations.

The following detailed description of the invention embodiments is provided in the context of the HRPD system and, as well, assumes the number of scheduling base stations to be two, but can be extended to any wireless packet data system and a greater number of scheduling base stations. Note further that, while the mobile station is generally characterized herein as being located at a cell edge or in a hand-off zone, the invention methodology is applicable to any mobile station served by two or more base stations, regardless of the particular location in a cell for the mobile station.

Consider illustratively the case of $DRC_1$ and $ACK/NACK_1$, i.e., mobile station channel and acknowledgement feedback to base station 1 (BS 1), and $DRC_2$ and $ACK/NACK_2$, i.e., mobile station channel and acknowledgement feedback to base station 2 (BS 2), each being transmitted with power that is adequate for reception at BS 1 and BS 2 respectively. As indicated above, however, with the methodology of the invention embodiment, mobile station transmission power is modified as warranted so that the mobile station will transmits $DRC_1$, $ACK/NACK_1$, $DRC_2$, and $ACK/NACK_2$ with sufficient power to be effectively received by BOTH BS 1 and BS 2.

Given the reception at BS 2 of the channel and acknowledgement feed back transmitted by the mobile station to BS 1 (or vice versa), the inferences that BS 2 is able to make about BS 1's actions can be characterized as follows:

1. Using the received $DRC_1$, BS 2 can determine the rate of transmission requested by the mobile from BS 1 at each slot. In most cases, BS 1 will follow this rate request and make a data transmission at this rate.
2. Given a positive acknowledgement ($ACK_1$) sent from the mobile station, BS 2 can infer that the packet from BS 1 was successfully received by mobile station at a particular time slot. From the fixed timing relationships between a packet and its acknowledgement, as well as consideration of a received $DRC_1$ and the packet transmitted in response, BS 2 can infer, in many cases, the rate and duration of the packet and thereby the size of the payload transmitted.
3. Given a negative acknowledgement ($NACK_1$), BS 2 can infer that that BS 1 will retransmit at a given time and be aware of the possibility of a concurrent transmission (from both itself and BS 1) to the mobile since this mode of transmission offers some additional performance gains when the mobile station is equipped with an interference cancelling receiver. The possible gain here is that BS 2 can determine (and transmit at) a higher rate to the mobile that it might have otherwise, premised on the successful decoding (and subtraction) of the data transmitted to the mobile from BS 1.

Figure 2:
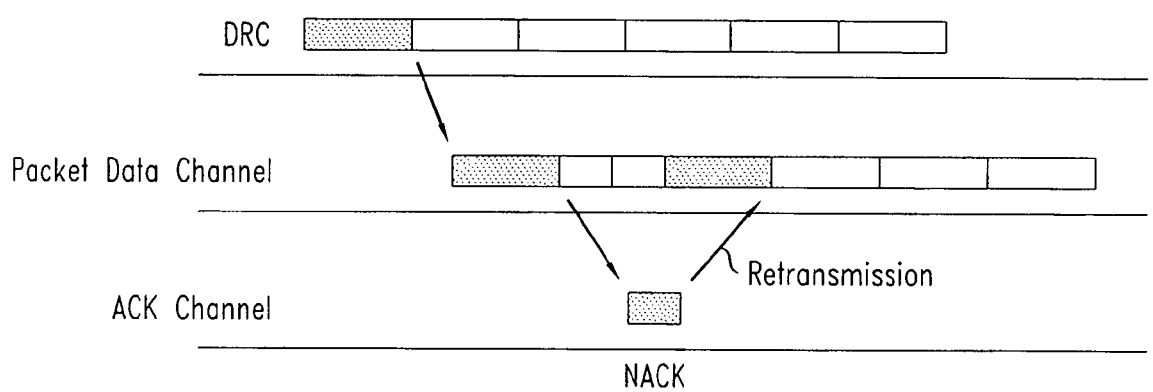
FIG. 2 depicts timelines for the transmission of DRCs, Packets, and ACK/NACKs used in the inference methodology of the invention.

Timelines for the transmission of DRCs, Packets, and ACK/NACKs that contribute to the inferences described are illustrated in FIG. 2.

The inference process of the invention may be usefully illustrated with an example case. Consider, for example, a DRC feedback from the mobile station to BS 1 of 0xC (from the C.S0024-B.v2 specification for the HRPD/EV-DO standard). This corresponds to a data rate transmission of 2.4576 Mbps—i.e. a packet size of 4096 bits sent over one 1.667 ms time slot. A positive or negative acknowledgement will be sent back after the mobile station attempts decoding of this packet with a 1 slot delay. BS 2 receives this DRC and knows that if BS 1 transmits to this user 1 slot later, it will be at a rate of 2.4576 Mbps using 1 time slot. When BS 2 observes an ACK or NACK on the fourth slot after observing this DRC value, it knows that BS 1 did indeed schedule a transmission to the mobile at this rate using a 4096 bit packet.

It should be clear, however, that the invention methodology is not limited to the above described means for a BS to infer the actions of another serving BS. One additional (and complementary) approach is for each scheduler to derive the probability of a mobile being scheduled by the neighboring scheduler(s) at each DRC value reported by it for those scheduler(s). This is again made possible by this scheduler being able to receive the DRC and ACK\NACK reports from the mobile for those BS(s) transmissions.

It is noted that, for some cases, BS 2 may not be able to accurately infer the size of the payload that was transmitted successfully to the mobile from BS 1, based on the heretofore described inference methodology. For example, multiple payloads transmitted from BS 1 (corresponding to BS 1 having chosen a lower data rate for transmission than was requested by the mobile) may appear to BS 2 to be consistent with the observed $DRC_1$ and $ACK/NACK_1$ stream received at BS 2. Additionally in the case of Voice over IP (VoIP) service, the chosen transmission rates may be substantially lower than the data rates requested by the mobile. Nonetheless, the inferences to be derived based on received DRCs and ACK/NACKs sent in respect to another serving base station are adequate for most data services and a particular base station scheduler is able to take appropriate scheduling actions bases on such inferences which will always improve system performance.

Additionally, for some packet data systems, the transmission protocol may not utilize the fixed timing relationships or the data rate or transmission span restrictions that made it possible in the above-described approach to infer the other scheduler's actions.

For such protocols, and for service types such as VoIP, the inventors provide, as an alternative embodiment of the invention, for a direct feedback from the mobile station of a payload size received from a first serving base station to a scheduler operating in a second serving base station. Preferably, that feedback of payload-size data from the mobile station is implemented via a new channel connecting the mobile station with its serving base stations. That channel, designated by the inventors as a Base Station Service Status (BSSS) channel, communicates information respecting a particular base station's transmissions to the other base stations that also serve a given mobile station. The BSSS channel for communicating information respecting BS 1 transmission is power controlled to reach BS 2 (and others if there are more than two serving base stations) reliably. The BSSS channel for communicating information respecting BS 2 transmissions is power controlled to reach BS 1 (and other base stations if there are more than two serving base stations) reliably. The BSSS channel can be used to supplement, or in some systems, replace the use of the other-base station channel feedback and acknowledgement information being sent by the mobile station.

Figure 3:
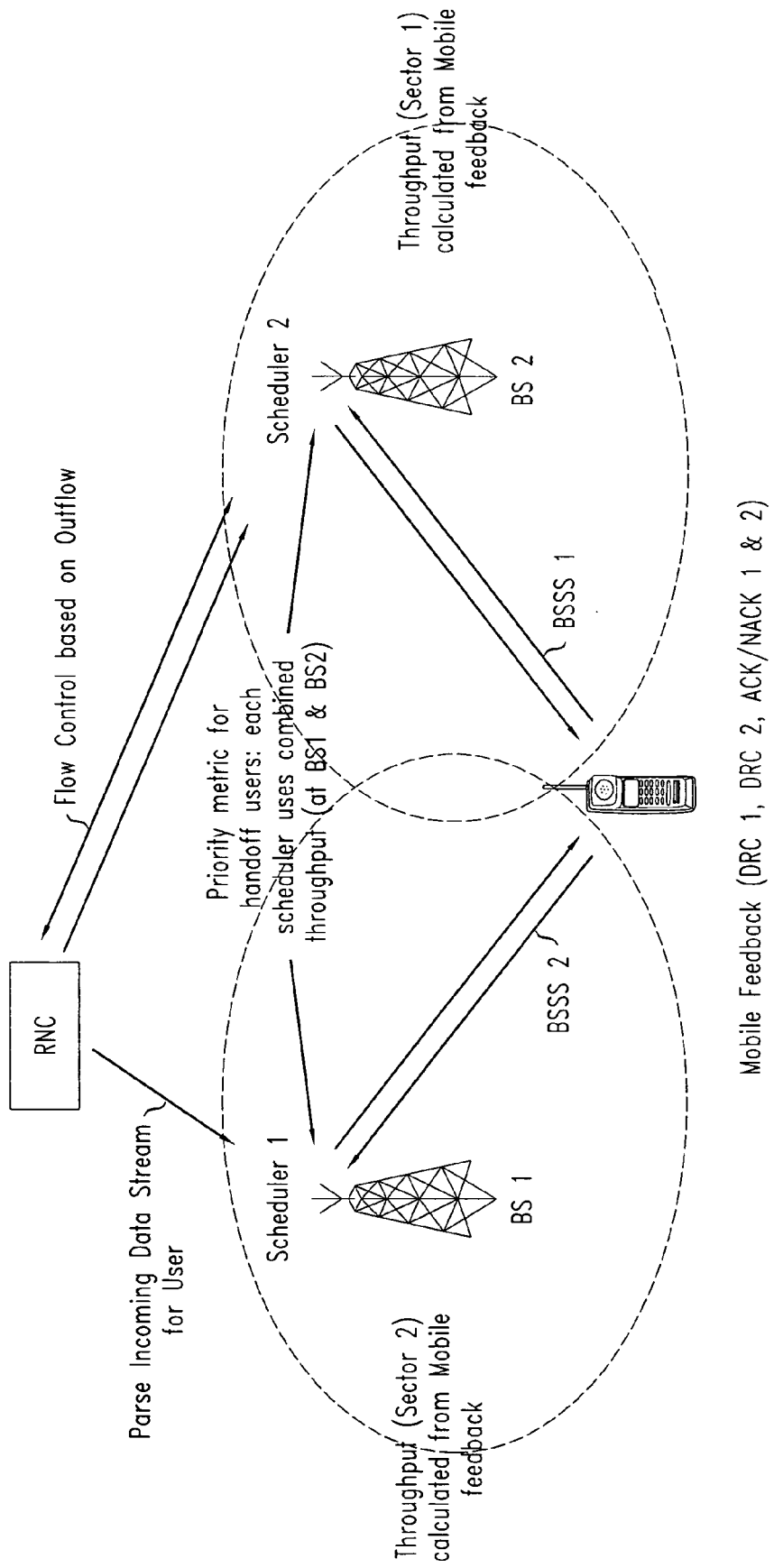
FIG. 3 schematically depicts the wireless system architecture of FIG. 1 modified to include invention components.

A schematic depiction is provided in FIG. 3 of the invention method for inferring, at a second serving base station, packet transmission and timing for transmissions to a given mobile from a first serving base station, along with depiction of the additional BSSS channel described here.

In operation, the mobile station sends, via the BSSS or an alternate signaling channel, the size of each payload that was successfully received from BS 1, to BS 2 (and vice versa). Alternatively, an aggregate of the payload size that was successfully received from BS 1 and BS 2 is sent, via the BSSS or another signaling channel, to BS 1 or BS 2, or both. This information is sent at the same time as every positive acknowledgement sent by the mobile station in response to transmissions from BS 1 (or BS 2). As a further alternative, the served rate for the user at each base station is calculated and communicated periodically to the other serving base station(s) or whenever it shows an appreciable change. When the backhaul link speeds permit, this throughput information can also be communicated by each base station to all other serving base stations over these links connecting the base stations.

In the case where multiple services are being supported on a mobile station (voice+data/video) the reported rates or payloads would be tagged with the service they are associated with. This will ensure that each service is supported with the desired quality by the schedulers.

Given the determination at BS 2 with respect to the timing and rate of data transmissions to a mobile station from BS 1 (as heretofore described), the operation of BS 2 in applying such inferences in its scheduler to the advantage of both cell edge users and the entire network is now considered. Specifically, the operation of the distributed scheduling system of the invention in the determination of data rates for transmission to the users to both maintain user fairness and to take advantage of the concurrent transmission to a user from multiple base stations is hereafter described in detail.

Rate Calculation:

Assume that the schedulers at each of the serving base stations use a proportional fair scheduler. Such a scheduler creates a priority metric for each user that is served by it. For the $i^{th}$ user at BS 1:

$$\text{Priority}_{i,1,t} = DRC_{i,1,t}/R_{i,1,t}$$

where $DRC_{i,1,t}$ is the supportable rate to the user i at some time t at BS 1, and $R_{i,1,t}$ is the throughput that the user i has obtained up to time t from BS 1.

In scheduler implementations of the current art, each scheduler only takes into account the throughput that it has delivered to a user, whether that user is in a handoff zone (and thus potentially served by multiple base stations) or not.

With the methodology of the invention, however, when such a user is served by two of more base stations, the scheduler at each base station will make determinations about the rate at which the user has been served at the other base station(s) (as described above). For this case—user i being served by both BS 1 and BS 2, scheduling fairness is achieved by replacement of $R_{i,1,t}$ and $R_{i,2,t}$ in the priority determinations by each scheduler with the sum of those throughput terms, i.e, $R_{i,1,t}+R_{i,2,t}$. By so replacing the throughput term applied by both schedulers, each scheduler is then using the correct fairness metric for the handoff-zone users and will therefore free up scheduling opportunities for users not in handoff, thereby increasing sector throughput.

Rate Aggression:

When BS 2 infers an impending transmission by BS 1 by virtue of monitoring a $NACK_1$ (i.e., in the EV-DO system, a retransmission follows a fixed time interval after a failed transmission), it can adopt a superposition strategy to boost the throughput to the user.

Figure 4:
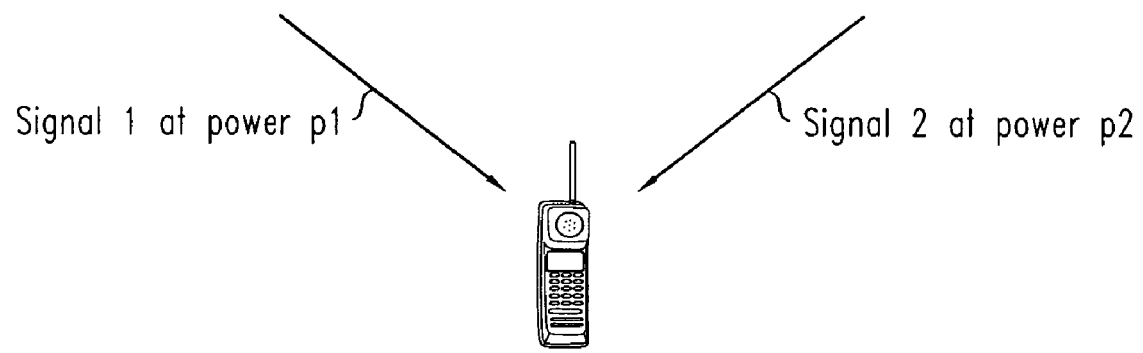
FIG. 4 schematically depicts a mobile station simultaneously receiving signals from two base stations, at respective transmission powers.

Before describing this approach of additionally increasing the throughput of an edge cell user using simultaneous transmissions from two base stations in detail, some background may be useful. Consider the mobile station depicted in FIG. 4, which should be understood to be equipped with an interference canceller, and that operates to receive two independent, simultaneous, transmissions from two base stations—specifically, signal 1 from the first base station and signal 2 from the second base station. The mobile station of FIG. 4 operates to (1) decode signal 1, (2) reconstruct and subtract transmissions (i.e., signal 1) received from the first base station from the composite signal it receives, and (3) decode the transmission from the second base station (i.e., signal 2) in the absence of any interference from the first base station—i.e., after cancellation (subtraction) of signal 1. As explained more fully below, this will provide a higher data rate transmission from the second base station than would have been possible without the interference canceller in the mobile station.

Now, assume, as depicted in the figure, that the transmission powers received at the mobile station from BS 1 and BS 2 are p1 and p2 respectively, that n is the noise power, and W is the bandwidth of the carrier. The data rate that can nominally be supported from BS 1 is:

$$R_1 = W \cdot \log(1+(p1/p2+n))$$

Similarly the data rate that can be nominally supported from BS 2 is:

$$R_2 = W \cdot \log(1+(p2/p1+n))$$

When concurrent transmissions are made from BS 1 and BS 2, a mobile station not equipped with an interference canceller, can receive data at an aggregate data rate:

$$R_{agg} = R_1 + R_2$$

On the other hand, a mobile station with an interference canceller, will obtain an aggregate rate of:

$$R_{agg(Ic)} = R_1 + W \cdot \log(1+p2/n) = W \cdot \log(1+(p1+p2)/n)$$

because the transmission from BS 2 is received without interference from BS 1 (which had been previously removed when the transmission from BS 1 was received and decoded successfully).

A simple numerical example will show that $R_{agg} < R_{agg(Ic)}$. Assume that the served mobile station is equidistant from the two serving base stations, and that transmission powers from the base stations are equal—i.e., p1=p2. Assume as well that the noise power n is also equal to the transmission power from each of the base stations, since the mobile station is located at cell edge. The ratio of the two aggregate rates (with and without interference cancellation) is:

$$R_{agg(Ic)}/R_{agg} = \log(3)/(2 \cdot \log(3/2)) = 1.35$$

Thus a 35% gain can be obtained when an interference canceller is employed at the mobile station. The gain from such a canceller is predicated on two factors: (i) superposed (simultaneous) transmissions to the user from the two base stations, and (ii) a transmission rate from BS 2 that takes into account the removal of interference from BS 1.

With this background, the scheduling methodology of the invention is now addressed in further detail. Essentially, the scheduling issue addressed by the invention can be characterized as follows. With the knowledge of BS 1's impending transmission, how does the scheduler at BS 2 make a decision on whether or not to schedule a transmission for the user at the same time. Further, if it does so, how does it make an appropriate (higher) rate assignment to achieve the synergistic benefit of joint distributed scheduling?

The action taken by the scheduler at BS 2 is two fold. It modifies the rate request from the mobile station DRC$_2$ into a new rate DRC$_{21}$ that takes into account the cancellation of the transmission from BS 1. Specifically:

$$DRC_1 = W \cdot \log(1+p1/(p2+n))$$

$$DRC_2 = W \cdot \log(1+p2/(p1+n))$$

$$DRC_{21} = W \cdot \log(1+p2/n)$$

DRC$_{21}$ is easily computed from DRC$_1$ and DRC$_2$. Now, the priority metric for this user at the BS 2 scheduler is based on DRC$_{21}$. Thus:

$$\text{Priority} = DRC_{21}/R(i,t)$$

If the above priority metric for a given user is higher than all other served users, BS 2 transmits to the given user using a rate and duration corresponding to DRC$_{21}$.

In summary, with the distributed scheduling approach of the invention, opportunities for concurrent transmission to the mobile station with gains in aggregate data rate are assessed in a fair manner via modifications to the priority metrics and the actual transmissions are made in such a manner as to get the gains of interference cancellation.

Flow Control

As a further embodiment of the invention, a method is here described by which data for a multi-stream user—i.e., a user being served by multiple base stations—is parsed at the RNC and flow control performed between the RNCs and each of the serving base stations.

In current wireless systems (e.g. EV-DO RevA/B), flow control is performed at the RNC. The buffer status of each link (RNC to Base Station Sector) is reported to the RNC in order for the RNC to distribute its available data to different links. Note that the reported buffer status is an aggregate status for a given link—i.e., the available buffer capacity for the pending transmissions of all users served via the given link.

With the system and method of the invention, data intended for a mobile at the cell edge can be split into separate flows to different serving base stations. Distribution of a given user's traffic loading among the RNC to base station links should preferably depend not only on the buffer capacity associated with the respective serving base stations, but should also take into account the condition of the airlink from each of the serving base stations to the mobile station. A method for achieving such multi-link flow control is described below in the context of a single mobile station being served by two base stations.

Base Station 1 (BS 1) and base station 2 (BS 2) each report back each successful transmission (the size of the payload) to the RNC or, alternatively, aggregate such information for periodic reporting.

The RNC calculates the rate at which each base station is delivering data to the user (outflow) and uses the ratio of these rates to determine the ratio in which to parse data available for transmission to the user between the two links. The inflow from the RNC to each serving base station is linked to the outflow from each base station to the mobile station.

Further, the RNC adapts this ratio according to variations in the outflow at the two serving base stations. When the mobile station is moving, one link is expected to get better and the other worse, and it is important for the RNC to adapt to this dynamic by sending out less data to the worsening link and more to the link that is improving. Such an approach will minimize the amount of data that is stranded at a base station that the mobile station is moving away from.

Herein, the inventors have disclosed a method and system for providing improved data throughput to users located at or near a cell edge in a wireless communication system. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method for scheduling transmission resources to a mobile station served by at least two base stations comprising:
    receiving, at a second of the at least two base stations, feedback information respecting at least one of channel and acknowledgement parameters for data received by the mobile station from a first of the at least two base stations;
    drawing an inference at the second base station of throughput parameters respecting a transmission channel between the first base station and the mobile station;
    scheduling transmission resources for the mobile station by the second base station as a function of the inferred throughput parameters, wherein scheduling of transmission resource by the second base station is arranged to enable simultaneous transmission to the mobile station from each of the at least two base stations using a common transmission resource; and
    wherein the mobile station implements interference cancellation to sequentially decode the simultaneous transmissions, cancelling a first received transmission before decoding a second received transmission.

2. The method of claim 1 wherein the common transmission resource is a same RF carrier.

3. The method of claim 1 wherein a scheduler at one or more of the at least two base stations receives feedback from the mobile station respecting a data rate that the mobile station can support (DRC) and operates to determine scheduling priority metrics for the at least two base stations as a function of the received DRCs.

4. The method of claim 1 wherein the mobile station feedback information includes acknowledgement parameters.

5. A method for scheduling transmission resources to a mobile station served by at least two base stations comprising:
    receiving, at a second of the at least two base stations, feedback information respecting at least one of channel and acknowledgement parameters for data received by the mobile station from a first of the at least two base stations;
    determining, at the second base station, a probability of the mobile station being served in a given transmission interval by the first base station; and
    scheduling transmission resources for the mobile station by the second base station as a function of the determined probability.

* * * * *